United States Patent
Young-Lai et al.

(10) Patent No.: US 7,359,922 B2
(45) Date of Patent: Apr. 15, 2008

(54) DATABASE SYSTEM AND METHODOLOGY FOR GENERALIZED ORDER OPTIMIZATION

(75) Inventors: Matthew Young-Lai, Waterloo (CA); Anisoara Nica, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 482 days.

(21) Appl. No.: 10/905,264

(22) Filed: Dec. 22, 2004

(65) Prior Publication Data

US 2006/0136368 A1 Jun. 22, 2006

(51) Int. Cl.
*G06F 17/30* (2006.01)

(52) U.S. Cl. ...................................... 707/200
(58) Field of Classification Search .................... 707/2, 707/3
See application file for complete search history.

(56) References Cited

U.S. PATENT DOCUMENTS

| | | | | |
|---|---|---|---|---|
| 5,619,692 A * | 4/1997 | Malkemus et al. | ............ | 707/2 |
| 6,266,658 B1 | 7/2001 | Adya et al. | ..................... | 707/2 |
| 6,353,821 B1 | 3/2002 | Gray | ............................ | 707/2 |
| 6,353,826 B1 | 3/2002 | Seputis | ........................... | 707/5 |
| 6,356,887 B1 | 3/2002 | Berenson et al. | ............. | 707/2 |
| 6,356,889 B1 | 3/2002 | Lohman et al. | ................ | 707/2 |
| 6,366,901 B1 | 4/2002 | Ellis | ............................... | 707/2 |
| 6,411,951 B1 | 6/2002 | Galindo-Legaria et al. | .... | 707/3 |
| 6,484,160 B1 | 11/2002 | Richard et al. | ................ | 707/2 |
| 6,510,422 B1 | 1/2003 | Galindo-Legaria et al. | .... | 707/2 |
| 6,567,802 B1 | 5/2003 | Popa et al. | ..................... | 707/3 |
| 6,581,055 B1 | 6/2003 | Ziauddin et al. | ................ | 707/4 |
| 6,618,719 B1 | 9/2003 | Andrei | .......................... | 707/2 |
| 6,643,636 B1 | 11/2003 | Au et al. | ....................... | 707/2 |
| 6,654,734 B1 | 11/2003 | Mani et al. | ..................... | 707/2 |
| 6,665,664 B2 | 12/2003 | Paulley et al. | .................. | 707/4 |
| 6,691,101 B2 | 2/2004 | MacNicol et al. | ............. | 707/2 |
| 6,754,652 B2 | 6/2004 | Bestgen et al. | ................ | 707/3 |
| 6,757,677 B2 | 6/2004 | Pham et al. | ................... | 707/5 |
| 6,813,617 B2 | 11/2004 | Wong et al. | ................... | 707/4 |
| 6,850,925 B2 | 2/2005 | Chaudhuri et al. | ............ | 707/2 |
| 6,865,567 B1 | 3/2005 | Oommen et al. | .............. | 707/2 |
| 6,915,290 B2 | 7/2005 | Bestgen et al. | ................ | 707/2 |
| 6,947,927 B2 | 9/2005 | Chaudhuri et al. | ............ | 707/3 |
| 6,968,330 B2 | 11/2005 | Edwards et al. | ............... | 707/2 |
| 6,985,904 B1 | 1/2006 | Kaluskar et al. | ............ | 707/101 |
| 6,996,556 B2 | 2/2006 | Boger et al. | ................... | 707/3 |
| 6,996,557 B1 | 2/2006 | Leung et al. | .................. | 707/4 |

(Continued)

*Primary Examiner*—Jean M. Corrielus
*Assistant Examiner*—Noosha Arjomandi
(74) *Attorney, Agent, or Firm*—John A. Smart; G. Mack Riddle

(57) ABSTRACT

A database system and methodology for generalized order optimization is described. In one embodiment, for example, in a database system, a method of the present invention is described for optimizing a query requesting data from a database in an ordered form, the method comprises steps of: generating a plurality of partial access plans for obtaining data requested by the query; constructing generalized orders representing requirements of the query for ordering of data, each generalized order representing a set of simple orders; creating generalized orders representing order properties of the partial access plans; intersecting the generalized orders representing requirements of the query for ordering of data with the generalized orders representing order properties of the partial access plans to determine partial access plans having favorable orderings; and building a query execution plan for obtaining and ordering the data requested by the query based, at least in part, on selecting partial access plans having favorable orderings.

32 Claims, 8 Drawing Sheets

U.S. PATENT DOCUMENTS

| | | | |
|---|---|---|---|
| 7,010,521 B2 | 3/2006 | Hinshaw et al. | 707/3 |
| 7,031,958 B2 | 4/2006 | Santosuosso | 707/3 |
| 7,111,025 B2 | 9/2006 | Finlay et al. | 707/203 |
| 7,184,998 B2 * | 2/2007 | Nica | 707/2 |
| 2002/0116357 A1 * | 8/2002 | Paulley | 707/1 |
| 2004/0006561 A1 | 1/2004 | Nica | 707/3 |
| 2004/0220923 A1 * | 11/2004 | Nica | 707/3 |

* cited by examiner

DATABASE SYSTEM AND METHODOLOGY FOR GENERALIZED ORDER OPTIMIZATION

CROSS REFERENCE TO RELATED APPLICATIONS

The present application is related to the following commonly-owned, presently-pending application(s): application Ser. No. 10/709,301, filed Apr. 27, 2004, entitled "Database System with Methodology for Automated Determination and Selection of Optimal Indexes"; application Ser. No. 10/600,932, filed Jun. 20, 2003, entitled "System and Methodology for Generating Bushy Trees Using a Left-deep Tree Join Enumeration Algorithm". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 12166 Bytes, created: Dec. 17, 2004 11:07:34 AM; Object ID: File No. 1; Object Contents: Source code.

BACKGROUND OF INVENTION

1. Field of the Invention

The present invention relates generally to information processing environments and, more particularly, to a database management system (DBMS) and methodology for use of generalized order properties in a query optimizer.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison-Wesley, 2000.

One purpose of a database system is to answer decision support queries. A query may be defined as a logical expression over the data and the data relationships set forth in the database, and results in the identification of a subset of the database. Consider, for instance, the execution of a request for information from a relational DBMS. In operation, this request is typically issued by a client system as one or more Structured Query Language or "SQL" queries for retrieving particular data (e.g., a list of all employees earning more than the average salary of all employees) from database tables on a server. In response to this request, the database system typically returns the names of those employees earning more than the average salary, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS (i.e., the query is declarative). Rather, a component called the optimizer determines the "plan" or the best method of accessing the data to return the result required by the SQL query. The query optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives.

A query optimizer transforms an SQL query into an access plan by generating different join strategies and, based on cost, choosing the best strategy. The process of generating a subspace of the space of all the join strategies is called join enumeration. Since relational databases typically only provide physical operators that can join two tables at a time, a join of a number of different tables (n-way join) must be executed as a sequence of two-way joins, and there are many possible such sequences. The optimizer must typically enumerate some or all of these sequences and choose one based on estimates of their relative execution costs.

In order to optimize a query, a query optimizer must be able to concurrently solve several different problems including: choosing the access method (e.g., sequential scan, index scan) for each base table used in the query; choosing the order in which to join the tables (i.e., the join order), and choosing the join method to be used for each join operation. In a complex query plan, order can be exploited by join, group by, distinct, and partitioning operators. Operators that exploit existing orders tend to be cheaper than their non-ordered counterparts, but creating order (e.g., with a sort or an index scan) can be expensive. However, some operators can preserve the order of their inputs, or pass it on in a modified form. Therefore, the possibility exists for an optimizer to construct plans that use a single order more than once, or that take advantage of an order that exists anyway (e.g., because of an ORDER BY clause) to make another operation such as a join or GROUP BY cheaper.

A framework for using order during query optimization is described by Selinger, et al. in "Access Path Selection in a Relational Database Management System", Proceedings of ACM SIGMOD Conference on Management of Data, pp. 23-34, May 1979 (hereinafter "Selinger"). Selinger provides for creating a list of "interesting orders" for a query, and then associating an "order property" with each partial plan as it is considered during optimization. An order property, in the sense used by Selinger, is a physical property of a stream of tuples. One way to represent an order property or an interesting order is to use an array O where each entry O[i] is a tuple (expr, seq), expr is an expression from the schema of the tuple stream, and seq is either "asc" or "desc" (short for ascending and descending, respectively). In this document, the term "simple order" is used for this representation. If a simple order has only one entry (e.g., (x, asc)), then values of x appear in the stream of tuples in increasing order (or non-decreasing if there are any tuples with equal values of x). Similarly, if the simple order is (x, desc), then the values of x appear in decreasing order (or non-increasing if there are any tuples with equal values of x). The extension to an arbitrary number of entries in a simple order is defined recursively: a simple order with k entries describes a stream of tuples where the tuples appear in the order specified by the first k-1 entries. Any tuples with equal values of the first k-1 expressions are together and form a slice of the stream. Each such slice is ordered according to the kth entry of the array.

Selinger does not describe any particular representation for interesting orders or order properties, but one obvious representation is the simple order described above. Every partial plan constructed during optimization has an order property associated with it. The order properties of the partial plans are compared against the interesting orders at appropriate points while building partial plans, and the costing is adjusted accordingly in cases where they match. Note that matching is a simple operation when both interesting orders and order properties are represented as simple orders: if the interesting order is a prefix of the order property, then the match is positive. Also note that the search algorithm used to generate and compare the partial plans is independent of the strategy for keeping track of order properties. The idea of creating interesting orders and attaching order properties to the physical properties of the partial plans can be used either for the join enumeration algorithm Selinger describes, or for other join enumeration algorithms.

The techniques described above are extended by Simmen, et al. in "Fundamental Techniques for Order Optimization", Proceedings of ACM SIGMOD International Conference on Management of Data, pp. 57-67, June 1996, and U.S. Pat. No. 5,619,692 (hereinafter referred to together as "Simmen"). Simmen extends the above techniques by allowing an interesting order or order property to be represented by a set of simple orders rather than just one simple order. The set representation that Simmen describes is a tuple (O, FD) where O is the same array used for a simple order and FD is a set of functional dependencies. Consider, for example, that:

x—>y is a functional dependency in FD

O[i]=(x,asc)

i<j

If this is the case, then the set includes any simple order that can be formed by inserting (y,asc) or (y,desc) at O[j]. This rule can be applied an arbitrary number of times, using different functional dependencies or the same one over and over again and all such constructed orderings are part of the set. Note that constants and equivalence classes (which Simmen also mentions) can be represented as functional dependencies for the sake of this discussion.

To simplify matching, Simmen describes an operation called "reduce" that converts the array O to a canonical form. This is essentially the inverse of the expansion described above. Assume the following:

x—>y i<j

O[i]=(x,asc)

O[j]=(y,desc)

In this case one can remove O[j] from the array. Once O is reduced, matching is exactly the same as with a simple order representation: an interesting order must be a prefix of an order property.

Unfortunately, the above-described techniques have several shortcomings. Simmen points out that an interesting order generated for a GROUP BY clause can match several different order properties. For example, "GROUP BY x,y" matches any of the following simple orders:

[(x,asc), (y,asc)]

[(x,asc), (y,desc)]

[(x,desc), (y,asc)]

[(x,desc), (y,desc)]

[(y,asc), (x,asc)]

[(y,asc), (x,desc)]

[(y,desc), (x,asc)]

[(y,desc), (x,desc)]

The only way to represent this type of interesting order using the techniques described above is to generate a separate interesting order for each of these possibilities. It would be more beneficial if they could all be represented simultaneously in a single data structure. Lacking a way to do this, the only simple solution is to choose just one of the orderings to use as the interesting order, and fail to match an order property that corresponds to any of the others. Simmen mentions this issue, but provides no solution to the problem.

Another way to improve the representation is to generalize order properties to describe tuple streams that are grouped but not totally ordered. Wang, et al. describe some techniques for doing this in "Avoiding Sorting and Grouping in Processing Queries", in Proceedings of the 29th Very Large Database (VLDB) Conference, Berlin, Germany, 2003. However, this type of generalization does not represent sets of simple orders.

A variation of the techniques of Simmen is described by Neumann et al. in "An Efficient Framework for Order Optimization" in Proceedings of the 20th International Conference on Data Engineering, ICDE 2004, 30 March-2 April 2004, Boston, Mass., pp. 461-472 (hereinafter "Neumann"). This variation is intended to improve the time efficiency of the basic operations like matching and reduction, and the space efficiency of the representation. The basic approach of Neumann is to construct an automaton that encodes the result of precomputing all the operations. A limitation of the approach of Simmen with respect to join enumeration is illustrated by the following example. Consider the query:

```
select * from

T join S on (T.x=S.x)

order by T.x, T.y
```

If one chooses to use a sort-merge join of S to T, then the sort of T will be on T.x. However, it should be possible to sort on T.x, T.y and avoid the final sort needed to satisfy the ORDER BY clause. If the optimizer operates by building partial plans bottom-up, then the order properties are calculated based only on the prefix of the plan. The initial set of indexes to consider is chosen based on interesting orders, but once the order property for a partial plan is set it cannot be changed based on operators added later in the plan.

When using dynamic programming for join enumeration, a partial solution to this kind of problem is to "push down" interesting orders (e.g., as described by Simmen). A more general solution is possible by using a top-down, goal-oriented search such as the one described by Graefe et al. in "The Volcano Optimizer Generator: Extensibility and Efficient Search", in Proceedings of Ninth International Conference on Data Engineering (ICDE), Apr. 19-23, 1993, Vienna, Austria, pp. 209-218 (hereinafter "Graefe"). A problem, however, is that the join enumeration algorithms of Simmen and Graefe both use significant amounts of memory. This is particularly problematic in an environment in which memory is limited.

What is needed is an improved approach that provides for efficiently handling cases like the above while using less memory. The solution should provide some of the benefits of either pushing down interesting orders or using a goal-directed search, but should do so in a memory-efficient manner. The present invention provides a solution for these and other needs.

SUMMARY OF INVENTION

A database system and methodology for generalized order optimization is described. In one embodiment, for example, in a database system, a method of the present invention is described for optimizing a query requesting data from a database in an ordered form, the method comprises steps of: generating a plurality of partial access plans for obtaining data requested by the query; constructing generalized orders representing requirements of the query for ordering of data, each generalized order representing a set of simple orders; creating generalized orders representing order properties of the partial access plans; intersecting the generalized orders representing requirements of the query for ordering of data with the generalized orders representing order properties of the partial access plans to determine partial access plans having favorable orderings; and building a query execution plan for obtaining and ordering the data requested by the query based, at least in part, on selecting partial access plans having favorable orderings.

In another embodiment, for example, a system of the present invention for optimizing a query requesting data from a database in an ordered form is described that comprises: a module for generating a plurality of partial plans for obtaining data requested by the query; a generalized order comprising a data structure for representing a set of simple orders; a module for constructing generalized orders representing interesting orders of the query and generalized orders representing order properties of each of the plurality of partial plans; a matching module for determining if a partial plan has order properties matching the interesting orders based on comparing a generalized order representing order properties of the partial plan with generalized orders representing interesting orders; and a module for building a query execution plan for obtaining and ordering the data requested by the query based, at least in part, on selecting partial plans having order properties matching the interesting orders.

In yet another embodiment, for example, in a database system, a method of the present invention is described for constructing an optimal query execution plan for executing a query requesting data in an ordered form, the method comprises steps of: identifying each query block within the query, each query block comprising an atomic portion of the query; creating subplans for each query block for returning data requested by the query; constructing a first set of generalized orders representing requirements of the query for ordering of data, each generalized order representing a set of simple orders; creating a second set of generalized orders representing order properties of each subplan; comparing generalized orders in the second set with generalized orders in the first set to identify subplans having favorable order properties; and building a query execution plan for returning the data in the ordered form requested by the query based, at least in part, on selecting subplans having favorable order properties.

DETAILED DESCRIPTION

Glossary

Figure 1:
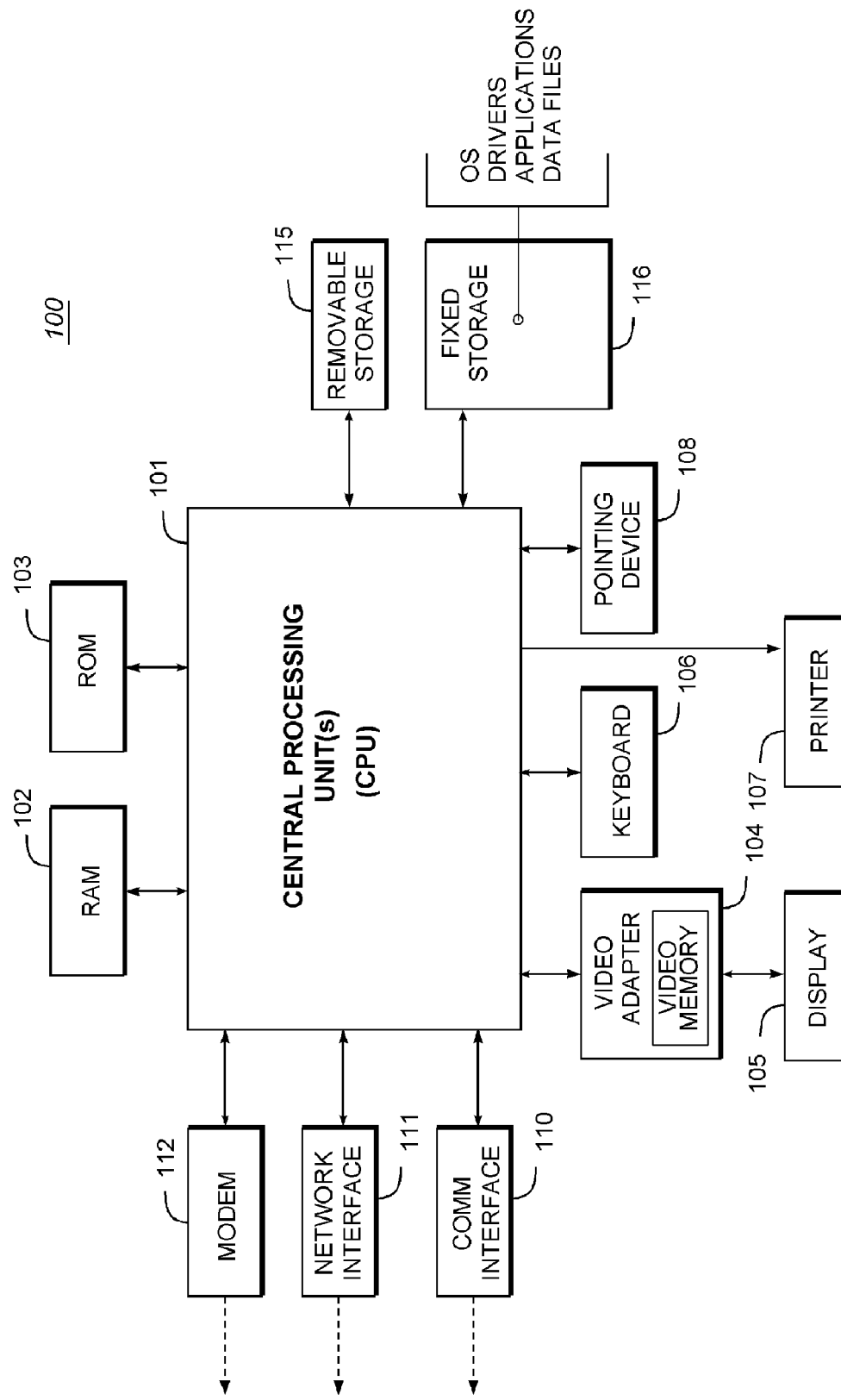
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Generalized order: The generalized order data structure provided by the present invention provides a representation that can store sets of simple orders in a single data structure. This is more space-efficient than storing all the individual simple orders of such a set. The generalized order representation improves and extends upon a simple order representation of an order property or an interesting order as hereinafter described.

Interesting order: An interesting order is a specification of a requirement of the query for ordering of data that may be useful for choosing the execution operators for executing the query, such as, for example, the execution operators for a join, a GROUP BY, a ORDER BY, or a DISTINCT.

Left-deep tree: A left-deep tree is a processing tree that has only base tables or derived tables as the right child for any join. Left-deep trees are desirable because they reduce the need to materialize intermediate results, and for several types of join implementations they result in more efficient execution plans. For further description of left-deep processing trees, see e.g., Cluet, S. et al. "On the Complexity of Generating Optimal Left-Deep Processing Trees with Cross Products", in Proceedings of the Fifth International Conference on Database Theory, pp. 54-67, January 1995, the disclosure of which is hereby incorporated by reference.

Order Property: An order property is a physical property of a stream of tuples which is computed for each operator used in a partial access plan based on the input streams to the operator and the operations performed by that particular operator.

Query block: A query block refers to an atomic portion or block of a query that has more than one block because the query contains derived tables, views, and/or subqueries. A query block can be the main block of an SQL SELECT, UPDATE, INSERT, or DELETE statement. A query block can be the main block of a SELECT-FROM-WHERE block (with or without GROUP BY and HAVING clauses) defining a view or a derived table. A query block can also be the main block of a subquery. In "Access Path Selection in a Relational Database Management System", Selinger, et al., Proceedings of ACM SIGMOD Conference of Management of Data, pp. 23-34, May 1979, a query block is defined as being "represented by a SELECT list, a FROM list, and a WHERE tree containing, respectively, the list of items to be retrieved, the table(s) referenced, and the Boolean combination of simple predicates specified by the user". A single SQL statement may have many query blocks because a predicate may have one operand which is itself a query.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

Simple order: A simple order is a particular representation of an order specification, i.e., an order property or an interesting order. The simple order representation uses an array O where each entry O[i] is a tuple (expr, seq), expr is an expression from the schema of the tuple stream, and seq is either "asc" or "desc" (short for ascending and descending, respectively). If a simple order has only one entry (e.g., (x, asc)), then values of the attribute x appear in the stream of tuples in increasing order (or non-decreasing if there are any tuples with equal values of x). Similarly, if the simple order is (x, desc), then the values of x appear in decreasing order (or non-increasing if there are any tuples with equal values of x). The extension to an arbitrary number of entries in a simple order is defined recursively: a simple order with k entries describes a stream of tuples where the tuples appear in the order specified by the first k-1 entries. Any tuples with equal values of the first k-1 expressions are together and form a slice of the stream. Each such slice is ordered according to the kth entry of the array.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
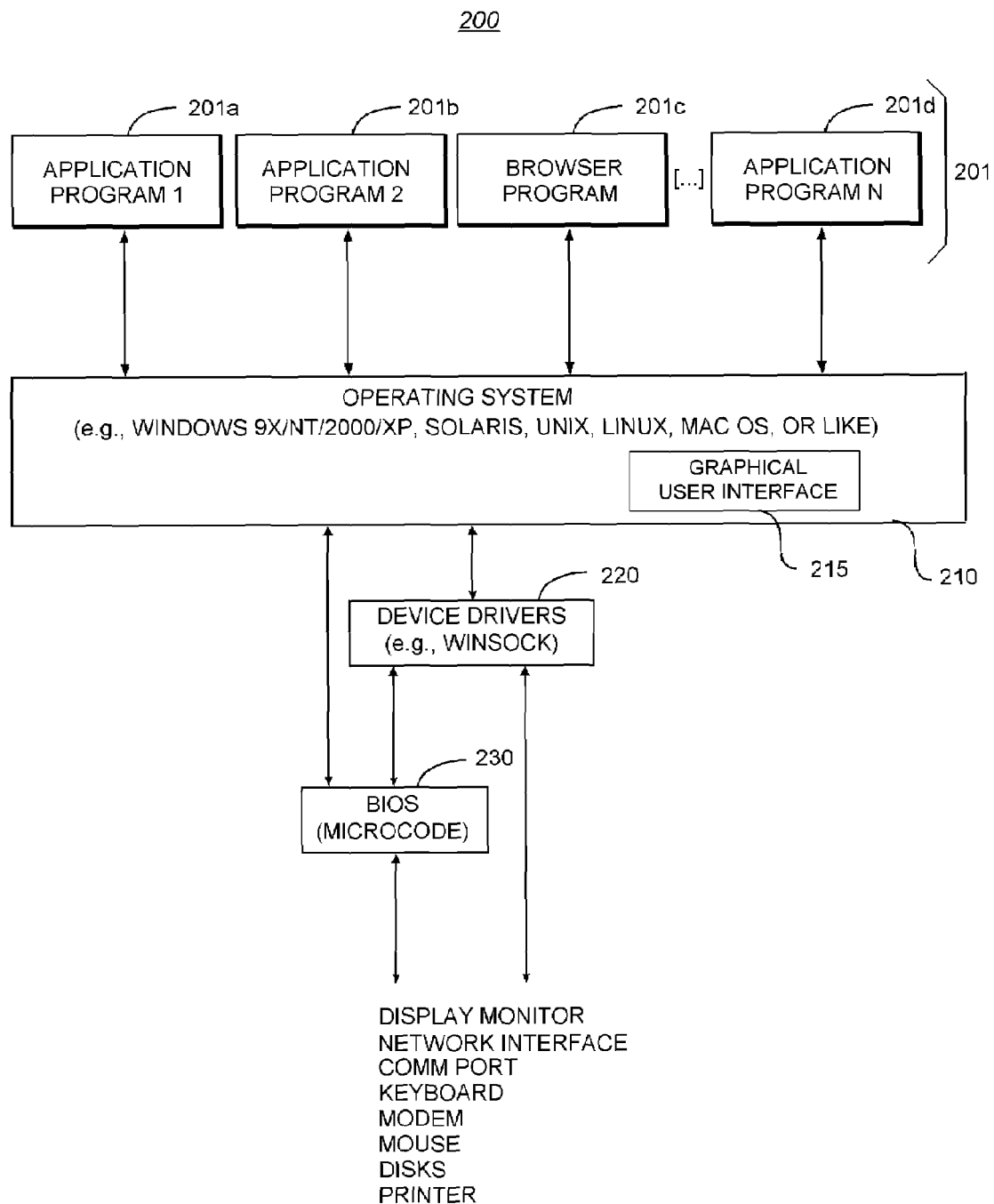
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-server Database Management System

Figure 3:
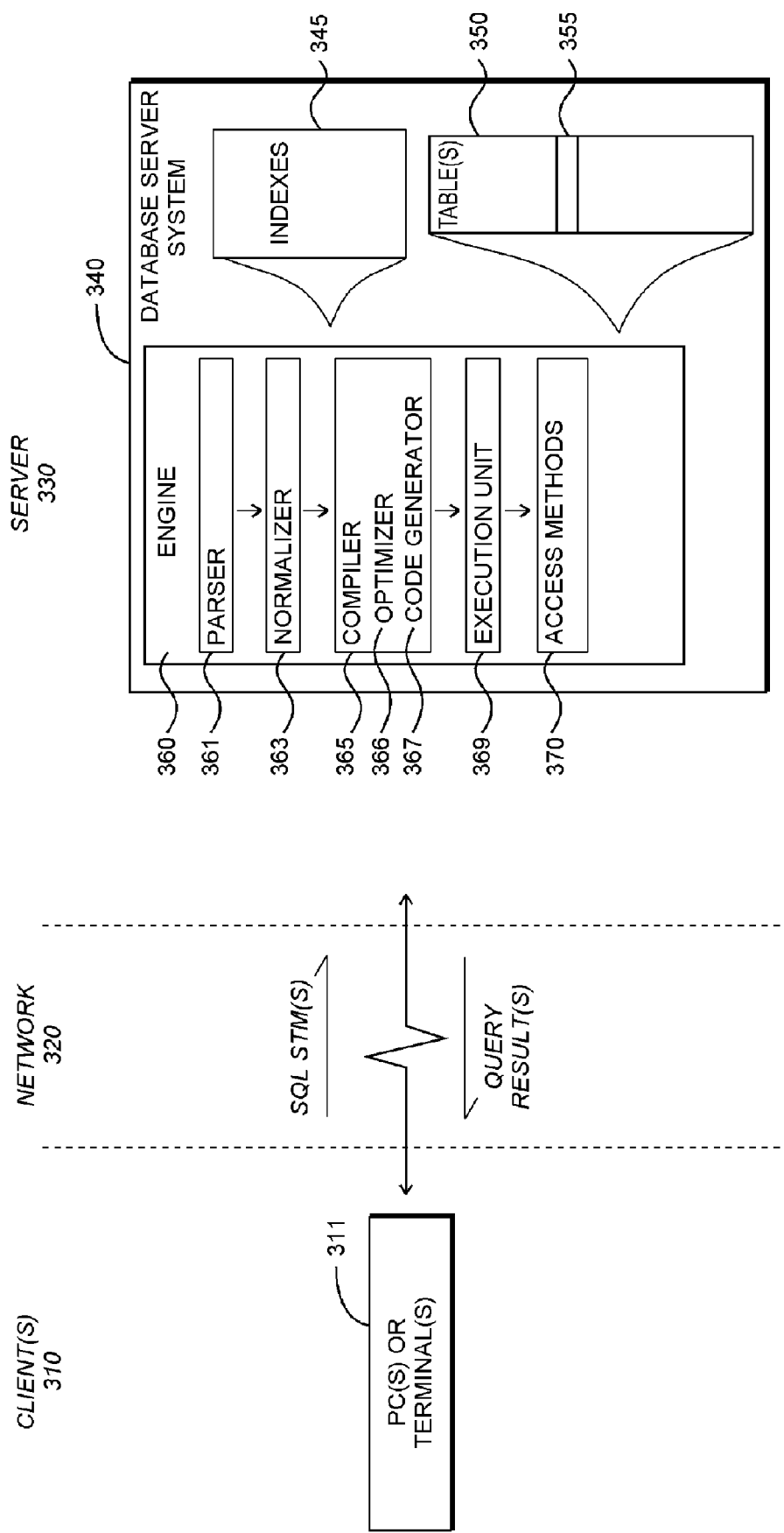
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Anywhere Studio (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase@-branded database servers and client/server environments generally, see, e.g., Nath, A., "The Guide to SQL Server", Second Edition, Addison-Wesley Publishing Company, 1995. For a description of Sybase® Adaptive Server® Anywhere Studio, see, e.g., "Adaptive Server Anywhere 9.0.1: Core Documentation Set," available from Sybase, Inc. of Dublin, Calif. This product documentation is available via the Internet (e.g., currently at sybooks.sybase.com/aw.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant tables. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database table(s) 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a row id (RID). This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Generalized Order Optimization

The present invention comprises a database system and methodology for generalized order optimization. It provides a representation that can store sets of simple orders in a single "generalized order" data structure. This is more space-efficient than storing all the individual simple orders of such a set. The class of sets it can represent is larger than the representation described in prior solutions, and therefore allows the optimizer to recognize matches between interesting orders and order properties in more cases (i.e., to identify partial access plans having order properties matching the interesting orders). It also allows the optimizer to reduce the size of the search space. The present invention also uses wildcard and dependency pointers to obtain some of the benefits of interesting order push down or goal-directed search without having to abandon a memory-efficient join enumeration methodology.

As previously discussed, one way to represent an order specification such as an order property or an interesting order is to use an array O where each entry O[i] is a tuple (expr, seq), expr is an expression from the schema of the tuple stream, and seq is either "asc" or "desc" (short for ascending and descending, respectively). In this document the term "simple order" is used for this representation. The present invention extends and improves upon this simple order representation. The improved "generalized orders" representation provided by the present invention is described as follows:

1) Extend the sequence type (i.e., as provided for a simple order) so that it can be either "asc" (ascending), "desc" (descending), or "ins" (short for insensitive). If there are k "ins" entries in a generalized order, then it contains all (2 to the power of k) combinations of the "asc" and "desc" orderings. For example, [(x,ins),(y,ins),(z,ins)] represents the following set of simple orders:

{[(x,asc),(y,asc),(z,asc)], [(x,asc),(y,asc),(z,desc)],
[(x,asc),(y,desc),(z,asc)], [(x,asc),(y,desc),(z,
desc)], [(x,desc),(y,asc),(z,asc)], [(x,desc),(y,
asc),(z,desc)], [(x,desc),(y,desc),(z,asc)], [(x,
desc),(y,desc),(z,desc)]}

2) Extend the schema of the tuples stored in O to include three items: (expr, seq, fixed), where the fixed attribute can be "true" or "false". For any slice of adjacent entries where the fixed attribute is false, the set contains all permutations of the entries in the slice. For example,

[(x,ins,false),(y,ins,false),(z,ins,false)] represents the union of the following sets, each of which is defined using the representation described in 1) above (i.e., using "ins" values for "seq" but not "fixed" values):

[(x,ins),(y,ins),(z,ins)]

union

[(x,ins),(z,ins),(y,ins)]

union

[(y,ins),(x,ins),(z,ins)]

union

[(y,ins),(z,ins),(x,ins)]

union

[(z,ins),(x,ins),(y,ins)]

union

[(z,ins),(y,ins),(x,ins)]

As another example, [(x,ins,true),(y,ins,false),(z,ins,false)] represents the following union of sets:

[(x,ins),(y,ins),(z,ins)]

union

[(x,ins),(z,ins),(y,ins)]

3) Extend a generalized order with another entry, WILDCARD, which is a possibly empty set of plan nodes. For every simple order in the set so far defined by O, also include every simple order that can be constructed by appending zero or more expressions that are available from plan nodes in WILDCARD. For example, (O, WILDCARD)=([(x,asc,true], {T}) represents the following set when {y, z} are all the expressions available from the plan node T:

[(x,asc,true)]

union

[(x,asc,true),(y,ins,true)]

union

[(x,asc,true), (z,ins,true)]

union

[(x,asc,true),(y,ins,false),(z,ins,false)]

As another example, (O, WILDCARD)=([ ], { }) represents the empty set.

Also, (O, WILDCARD)=([ ], all plan nodes) represents the universal set of all simple orders that can be constructed from the plan nodes.

4) Note that an FD (functional dependency) field is not explicitly included in the generalized order representation of the present invention. Operations on generalized orders such as reduction and matching do need to know what functional dependencies are available. However, it is assumed that the optimizer knows the set of functional dependencies that are valid for any partial plan.

Operations on Generalized Orders

The reduce operation on generalized orders cannot be applied strictly as a pre-processing step as is the case with simple orders. This is because it depends on the order of the elements in the O array which is not fixed in the generalized order representation. That is, for positions where fixed=false, the order is allowed to change during the optimization process. Therefore, the following illustrates the modified reduce method used for pre-processing:

```
1: input:
2:     a set of functional dependencies FD
3: a generalized order g=( O, WILDCARD )
4: output:
5:     a reduced version of g
6: for i from |O| down to 1
7:     for j from 1 to i
8:     let B= O[j].expr   // i.e., an expression preceding ith element in
9:                         // the array O
10:    if( B -> { O[i].expr } is in FD AND O[i].fixed is true )
11:        remove O[i] from O
```

The important difference from the methodology of Simmen is that only elements where fixed=true are removed. For the remaining elements, additional reduction may take place during the matching operation described later. Given two generalized orders, one of which represents an interesting order and one of which represents an order property, the process for testing whether they match is more complicated than checking that the interesting order is a prefix of the order property. Note that the representation of Simmen does not have this problem since all simple orders in the set are equivalent. Therefore, it is sufficient to match only a single canonical representative from each set. Two possible rules for matching generalized orders are as follows:

1) check if the intersection of the sets of simple orders they represent is non-empty and if so, return true; or 2) check if one set is a subset of the other set and if so, return true.

In its currently preferred embodiment, the present invention uses the first rule as it is more optimistic than the second rule (i.e., it matches generalized orders that second rule rejects). When using this rule, one important requirement is that the result of every non-empty intersection be calculated and stored. Consider the case of a logical sort that has its order property represented as a generalized order (i.e., a set of simple orders). The result of matching this order property with an interesting order is a new, smaller set of simple orders again represented as a generalized order. When it comes time to construct the physical sort operator, only one simple order needs to be chosen (since a stream cannot simultaneously satisfy several, non-equivalent simple orders). However, it is important to choose one that is included in the intersection rather than only in the original generalized order associated with the logical sort.

The generalized order of the present invention also includes a "dependency" pointer that can point to another generalized order. That is, a generalized order is extended to be a tuple g=(O, WILDCARD, DP), where O is an array representation as described above, WILDCARD is a set of plan nodes as described above, and DP is a dependency pointer to an order property obtained from the intersection of g with an interesting order. DP is NULL if no such non-empty intersection has taken place.

This may be illustrated by an example. Assume that g1 is an order property, and it is intersected with g2 which is an interesting order. Then, if the intersection is not empty, another generalized order g3 is created to represent the intersection of g1 and g2. The dependency pointer of g1 is set to point to g3. One can then use g3 to match another interesting order g4 and produce a generalized order g5. At that point, the dependency pointer of g3 is set to g5. In this way, a chain of dependencies is built between the order properties. When building a physical sort to satisfy an order property, the chain of dependencies is traversed to the end and a simple order is chosen from the generalized order found at the end of the chain. This simple order matches all the generalized orders of the chain.

In addition to being required for correctness, the dependency mechanism between generalized orders also provides some of the benefits of a goal-directed join enumeration. Consider the same example query (repeated from above):

select * from

T join S on (T.x=S.x)

order by T.x, T.y

If a sort-merge is chosen for the join, then the order property for the sort of T is as follows:

g1=([(T.x, asc, true)], {T}, NULL)

This is propagated through the join and it becomes the order property of the join. When the join enumeration is finished, an attempt is made to match the order property of the final join to the interesting order defined by the ORDER BY clause:

g2=([(T.x,asc,true),(T.y,asc,true)], {T,S}, NULL)

The intersection of these two generalized orders is a non-empty new generalized order g3:

g3=([(T.x,asc,true),(T.y,asc,true)], {T}, NULL)

Therefore, the match returns true and the dependency pointer of g1 is set to be g3:

g1=([(T.x, asc, true)], {T}, g3)

Because the match was positive, a final sort does not need to be performed. When the sort is constructed for g1, the dependency pointer is followed to g3 and a simple order from that set is chosen. It should be observed that this approach is not quite as general as using a goal-directed approach since it depends on considering a sort merge strategy for the join during enumeration. Since the join-enumeration is performed blindly without the pre-determined intention of producing a particular ordering, the plan that avoids the final sort may or may not be considered. However, the join enumeration methodology used by the present invention is more memory efficient. Therefore, this technique is a way for obtaining some of the benefits of a goal-directed enumeration algorithm without the memory cost.

There are two more benefits of the dependency mechanism that should be mentioned. One involves optimization across query blocks. When a block for a derived table or subquery is optimized, the best access plan has an associated order property. If the order property originated from a sort, then it can represent a set containing more than one simple order. Therefore, if the order property matches an interesting order while optimizing the containing block, it is possible to modify the sort in the contained block. Again, this provides the same benefit as pushing down interesting orders in a number of cases.

Another example involves virtual indexes. An example of a case where there is a need to represent sets of orders in a single data structure is pointed out in commonly-owned, co-pending U.S. patent application Ser. No. 10/709,301 by Farrar et al. titled "Database System with Methodology for Automated Determination and Selection of Optimal Indexes" (hereinafter "Farrar"), the disclosure of which is hereby incorporated by reference. Given a set of predicates, one can generate a separate virtual index and order property for every permutation of the columns used in the predicates. As described by Farrar, a candidate virtual index is generated for every combination of sargable equality predicates for each table. Every interesting order is then used to "extend" every candidate index. This second step can be simplified if the indexes are represented using generalized orders. Rather than extending a given index from the first step with each interesting order in turn, one can simply add a wildcard that contains a single plan node corresponding to the table that the index applies to. After optimizing a query, one can follow the dependency chain for a virtual index to find the final result of any intersections with interesting orders. This is a significant generalization of the notion of "hardening" positions in the index during optimization. In addition to allowing the fixing of columns in position, this enables the virtual index to be extended with additional columns as a result of matching.

System Components

General Process of Query Optimization

Before describing the invention in more detail, it is helpful to describe the overall process of query optimization as well as the depth-first join enumeration algorithm as implemented in the database management system of the currently preferred embodiment. The database management system used in the currently preferred embodiment is Sybase® Adaptive Server® Anywhere (ASA). Adaptive Server Anywhere is the relational database system that forms the core module of Sybase® SQL Anywhere® Studio, a suite of technologies intended for use in workgroup, mobile, and embedded applications.

Figure 4:
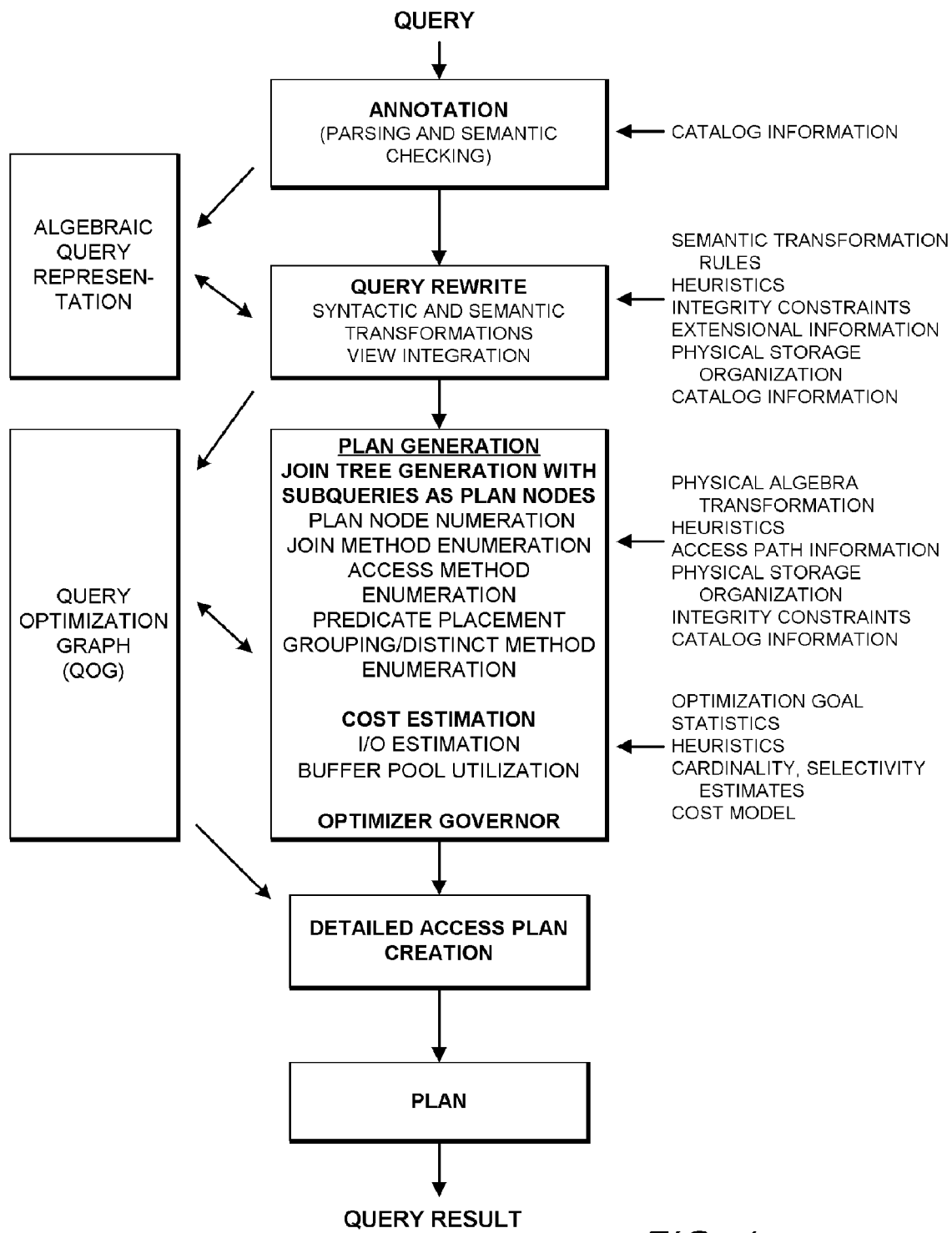
FIG. 4 illustrates the overall process of query optimization in the database system of the currently preferred embodiment.

FIG. 4 illustrates the overall process of query optimization in the database system of the currently preferred embodiment. As shown, the input to the plan generation phase of query optimization is a Query Optimization Graph (QOG), pronounced "cog". A QOG is the internal representation of a complete SQL statement, possibly composed of multiple "subquery blocks". The following discussion focuses on selection queries, although QOGs are also constructed for "UPDATE", "DELETE", and "INSERT" statements.

The database entities referred to by each subquery block, including tables, columns, predicates, and so on, are all included in the QOG. The set of subquery blocks within a QOG form a tree, with the outermost "SELECT" block at the root. Each subquery block, which, for example, can represent an input to a "UNION" operation, or a true subquery contained within an "EXISTS" predicate, is optimized independently in a bottom-up fashion. Complex queries, such as those involving views containing "GROUP BY" or "UNION", are modeled in a QOG through the use of multiple subquery blocks.

Plan generation involves the generation of alternative "join strategies" for each subquery block. Unlike some other optimizers which separate join enumeration from plan generation and cost estimation, the optimizer of the currently preferred embodiment combines these processes into a single unified methodology. As shown at FIG. 4, cost estimation is an integral part of the enumeration method, because it is through comparing the costs of partial access plans that the optimizer can quickly prune significant portions of the join strategy search space. The plan generation phase optimizes each subquery in the QOG independently, starting with the leaves. For each subquery, plan generation involves the following four distinct high-level steps:

1. adjust predicate selectivities to account for disjuncts, "BETWEEN" predicates, and user estimates of selectivities;

2. construct a join graph for the query that models inner and outer equijoin predicates, sargable single-variable predicates on single quantifiers, and Cartesian products;

3. enumerate join strategies and prune the search space using a branch-and-bound heuristic; and 4. recall the least expensive (i.e., cheapest) strategy and construct the detailed access plan for that strategy.

Depth-first Query Optimization

A depth-first join enumeration algorithm is implemented in the currently preferred embodiment of the present invention. A depth-first join enumeration methodology suitable for use in conjunction with the present invention is described in more detail commonly-owned, co-pending U.S. patent application Ser. No. 10/600,932 titled "System and Methodology for Generating Bushy Trees using Left-Deep Tree Join Enumeration Algorithm", the disclosure of which is hereby incorporated by reference. The following briefly describes this depth-first join enumeration methodology to facilitate the following discussion of the operations of the present invention.

Consider the problem of finding a left-deep plan that joins n quantifiers q1, q2, . . . , qn. A quantifier may correspond to either a base table or a derived table. A given permutation qi1, qi2, qi3, qi4, . . . , qin represents the plan where qi1 is first joined to qi2, then qi3 is joined to the result of the previous join, then qi4 is joined to that result, and so on. This is referred to as a left-deep plan since each step joins only a single quantifier to the intermediate result. That is, no intermediate result is ever joined to the intermediate result of another join.

A complete plan includes the physical join operators used as well as the order in which quantifiers are joined. It also includes any access methods (e.g., indexes for base tables) that may be used to access the quantifiers in the plan. Therefore, a complete plan can be represented as a sequence of triples (q, jm, am) where q is a quantifier, jm is a join method, and am is an access method. The first quantifier in the plan has a "NULL" join method since there is no preceding intermediate result to which it may be joined. There are several possible ways to represent a plan in a search tree. One may have a quantifier node with all of the possible join methods as child nodes, and all of the possible access methods that can be used for a join method as children of the join method node. In the currently preferred embodiment, every (jm, am) pair is treated as a child of the quantifier node, but this choice is not required for implementation of the present invention.

The process of optimizing a given query can be described as follows. When a query is received, rewrite optimizations are applied and a semantically equivalent rewritten query is generated. A Query Optimization Graph (QOG) is generated for each query block. The process of examining each query block in order to determine the most favorable plan for each access method of the plan node ranging over such query block commences. For each subplan in the QOG, the best access plans are determined starting with the most nested plans.

The building of access plans is performed in a step-by-step manner. A set of plan node candidates to be placed in the next position of the current access plan (AP) under consideration is generated. Several steps are then performed for each plan node (pn) candidate. A plan node candidate is selected from the generated set of candidates. Next, a set of join method, access method (jm, am) candidates to be used with the current plan node pn is generated. For each candidate join method and access method (jm, am), the pn(jm, am) candidate plan segment is placed in the current access plan.

The current access plan being considered (which may (or may not) contain all the plan nodes) is evaluated based on physical properties such as pipeline characteristics and execution cost computed based upon such factors as CPU cost and input/output (I/O) cost. If the current partial access plan under consideration is found to be less favorable than the best plan previously found, then the last plan node is unplaced. In other words, the current candidate plan segment is pruned, as it is less favorable than another previously found. The steps of adding and considering plan segments may then be repeated. Specifically, a new join method and access method pair is added to the current plan node pn (if candidate join methods and access methods (jm, am) are available for the current plan node pn). If all candidate join methods and access methods (jm, am) for a given plan node have been examined, then new plan nodes are examined (if additional candidate plan nodes are available). This process may continue until all plan nodes and their join methods and access methods have been examined at this position. This process may also be interrupted if it is determined that continuing the search of a particular subspace will not improve the best plan previously found or if the effort spent in the current search space exceeds an established threshold.

If the current partial access plan under consideration is more favorable than the best plan previously found, a determination is made as to whether the current access plan represents a complete plan. If the current access plan is a complete plan, the plan is retained as the new best plan and the process proceeds with the examination of additional alternatives while candidates remain available. Otherwise, if the current access plan is not a complete plan, the method proceeds to examine one or more plan nodes for the next position(s) in the current access plan.

This process continues until all portions of the current search subspace have been considered (or until a quota available for considering alternatives is exhausted). The above steps are then repeated for additional query blocks until all query blocks have been optimized. After all query blocks have been optimized, a detailed access plan is constructed based upon the best plans found for each query block. The system and methodology of the present invention for use of order in query optimization will now be described in greater detail.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Construction of Generalized Order

The methodology of the present invention for constructing a generalized order that is the intersection of two other generalized orders will now be described in detail. As previously discussed, the possible values of seq (as found in a simple order representation) have been modified by adding "ins" (an "insensitive order") as shown below:

```
1: // The possible values of seq
2: typedef enum SORT_SEQUENCE {
3:     INSENSITIVE_ORDER,
4:     ASCENDING_ORDER,
5:     DESCENDING_ORDER
6: } SORT_SEQUENCE;
```

The following is a subset of an OrderSet interface which is used to perform intersections:

```
10: class OrderSet {
11:
12: public:
13:     static OrderSet * Intersect( OrderSet & s1, OrderSet & s2 );
14:
15:     // Return O[i].expr
16:     p_expr        ElementExpr( a_column_index i );
17:
18:     // Return O[i].seq
```

```
19:   SORT_SEQUENCE ElementSequence( a_column_index i );
20:
21:   // Return O[i].fixed
22:   a_bool        ElementFixedPosition( a_column_index i );
23:
24:   // Return the size of O
25:   uint          Size( );
26:
27:   // Return WILDCARD
28:   PlanSegmentSet & Wildcard( );
29:
30:   // Append a new entry to O
31:   void Append( p_expr expr, SORT_SEQUENCE seq, a_bool
      fixed );
32:
33: private:
34:   ...
35: };
```

The following Intersect method finds the intersection of two order sets that may have arbitrarily many fixed and unfixed positions:

```
38: OrderSet *
39: OrderSet::Intersect( OrderSet & s1, OrderSet & s2 )
40: /****************************************************/
41: // Find the intersection of two order sets that may have arbitrarily
42: // many fixed and unfixed positions. Return NULL if the intersection
43: // is empty.
44: {
45:
46:   // Create an order set to hold the intersection result
47:   OrderSet * result = BuildEmpty( );
48:
49:
50:   // Create a wrapper object for both OrderSets. The wrapper keeps
51:   // track of the current position in the OrderSet (initially 0),
52:   // which elements of the OrderSet have been marked (initially
53:   // empty), and how many elements have been removed because of
54:   // functional dependencies. See below for the definition of the
55:   // OrderSetWrapper class.
56:   OrderSetWrapper o1( s1 );
57:   OrderSetWrapper o2( s2 );
58:
59:
60:   // While both OrderSets have unmatched elements, match one
61:   // element at a time
62:   while( !o1.Done( ) && !o2.Done( ) ) {
63:
64:     // If at least one OrderSet has a fixed position element at
65:     // the current position, then try to match that element in the
66:     // other
67:     if( o1.Fixed( ) ) {
68:        if( !setElement( o1, o2, result ) ) {
69:          return NULL;
70:        }
71:     } else if( o2.Fixed( ) ) {
72:        if( !setElement( o2, o1, result ) ) {
73:          return NULL;
74:        }
75:
76:     // Both OrderSets have unfixed elements at their current
77:     // position
78:     } else if( !matchUnfixedRegion( o1, o2, result ) ) {
79:        return NULL;
80:     }
81: }
82:
83:
84:   // We have matched all the elements in one of the OrderSets. Try
85:   // to match the remaining entries in the other against the
86:   // wildcard.
87:   if( o1.Done( ) ) {
88:     if( !o2.MatchTail( result, s1 ->Wildcard( ) ) ) {
89:        return NULL;
```

```
90:   }
91: } else {
92:   if( !o1.MatchTail( result, s2->Wildcard( ) ) ) {
93:     return NULL;
94:   }
95: }
96: result->Wildcard( ) = s1 ->Wildcard( )->intersect( s2->Wildcard( ) );
97:   return result;
98: }
```

As shown above at line 47, a result OrderSet is created to hold the intersection result. A wrapper object is then created for both OrderSets being intersected as shown at lines 56-57. The wrapper keeps track of the current position in the OrderSet (initially 0), which elements of the OrderSet have been marked (initially empty), and how many elements have been removed because of functional dependencies. The OrderSetWrapper class is described below in more detail.

As shown above commencing at line 62, while both OrderSets have unmatched elements, elements are matched one at a time. Attempts are made to match both fixed and unfixed elements. If at least one OrderSet has a fixed position element at the current position, then an attempt is made to match that element in the other OrderSet as provided at lines 67-74. If both OrderSets have unfixed elements at their current position, a matchUnfixedRegion method is called to try to match unfixed elements as shown at lines 78-80. After all the elements in one of the OrderSets have been matched, the routine invokes a MatchTail method to try and match the remaining entries in the other OrderSet against the wildcard as provided at lines 87-95. The methods that are invoked are described below in greater detail.

The following OrderSetWrapper class is a utility class that wraps both OrderSets during an intersection:

```
103: class OrderSetWrapper {
104: private:
105:   OrderSet &    _os;          // The wrapped OrderSet
106:   int           _i;           // Current position in _os
107:   int           _deleted;     // Number of elements
       // removed because of fds
108:   bitvector     _marked;      // Which elements of
       // _os are marked
109:
110: public:
111:   OrderSetWrapper( OrderSet & os )
112:     : _os( os )
113:     , _i(0)
114:     , _deleted(0) { }
115:
116:   // Return TRUE if the current position is greater than the size of
117:   // the OrderSet, i.e., if all elements in the OrderSet have been
118:   // matched
119:   a_bool Done( ) const { return _i >= _os.Size( ); }
120:
121:   // Return TRUE if the current element is fixed in position
122:   a_bool Fixed( ) const { return _os.ElementFixedPosition(_i); }
123:
124:   // Return TRUE if O[i] is fixed in position
125:   a_bool Fixed( const int i ) const { return
       _os.ElementFixedPosition(i); }
126:
127:   // Return TRUE if O[i] is marked
128:   a_bool Marked( const int i ) const { return _marked[i]; }
129:
130:   // Return the seq field of O[i]
131:   SORT_SEQUENCE Seq( const int i ) const { return
       _os.ElementSequence(i); }
132:
```

```
133:    // Return the expr field of O[i]
134:    p_expr Expr( const int i ) const { return __os.ElementExpr(i); }
135:
136:    // Return the size of O in the OrderSet
137:    int Size( ) const { return __os.Size( ) - __deleted; }
138:
139:    // Mark O[i]
140:    void Mark( const int i ) { __marked[i] = TRUE; }
141:
142:    // Find an unmatched element element at or around O[i]
143:    a_bool FindUnmatched( int & i );
144:
145:    // Count the number of unfixed elements adjacent to O[_i]
146:    int CountUnfixedElements( const int r );
147:
148:    // Match elements from a region of adjacent unfixed elements
149:    a_bool MatchUnfixedRegion( const int count, OrderSetWrapper &
        other, OrderSet * result );
150:
151:    // Match elements against a wildcard
152:    a_bool MatchTail( OrderSet * result, PlanSegmentSet wildcard );
153:
154:    // Return TRUE if the expression at position i can be removed
155:    // because of a functional dependency. (The details of this
156:    // operation are omitted.)
157:    a_bool FunctionallyDetermined( const int i ) {
158:        if( /* expression at position i can be removed */ ) {
159:            ++__deleted;
160:            return TRUE;
161:        } else {
162:            return FALSE;
163:        }
164:    }
165: };
```

The below setElement routine tries to set the next element of "result" by matching an unmatched element of o1 to an element of 02:

```
168: a_bool
169: OrderSet::setElement(
170:    OrderSetWrapper &  o1,
171:    OrderSetWrapper &  o2,
172:    OrderSet *         result )
173: /***********************************/
174: // Try to set the next element of 'result' by matching an unmatched
175: // element of o1 to an element in o2
176: {
177:    volcano_uint    result_index;
178:    SORT_SEQUENCE   result_seq;
179:    volcano_uint    class1;
180:    int             i1;
181:    int             i2;
182:
183:    // Find an unmatched expression in o1
184:    if( !o1.FindUnmatched( i1 ) ) {
185:        return FALSE;
186:    }
187:
188:    // Try to match it in o2
189:    if( !o2.MatchExpr( o1.Expr(i1), i2 ) ) {
190:
191:        // No match found - the only way the intersection can be
192:        // non-empty is if O[i1] can be removed from o1 by applying a
193:        // functional dependency.
194:        return o1.FunctionallyDetermined( i1 );
195:    }
196:
197:    // Combine the two sequences
198:    result_seq = o1.Seq( i1 );
199:    switch( result_seq ) {
200:    case INSENSITIVE_ORDER:
201:        result_seq = o2.Seq(i2);
202:        break;
203:    case ASCENDING_ORDER:
204:    case DESCENDING_ORDER:
205:        if( o2.Seq(i2) != INSENSITIVE_ORDER && result_seq !=
        o2.Seq(i2) ) {
206:            return FALSE;
207:        }
208:        break;
209:    }
210:
211:    // Append the matched expression to the result
212:    result->append( o1.Expr(i1), result_seq, o1.Fixed(i1) );
213:
214:    // Mark the two elements as matched
215:    o1.Mark( i1 );
216:    o2.Mark( i2 );
217:    return TRUE;
218: }
```

The above setElement routine invokes a FindUnmatched method to locate an unmatched element in a first OrderSet (o1) as illustrated at lines 184-186. It then calls a MatchExpr method as shown at line 189 to try to match the element with an element of the second OrderSet (o2). If a match is found, the matched expression is appended to the result and the elements are marked as matched. Otherwise, if no match is found the only way the intersection can be non-empty is if the element can be removed from o1 by applying a functional dependency.

The following FindUnmatched method searches for an unmatched element at or around the current position. If an unmatched element is found the method returns TRUE and sets i to the position of the unmatched element:

```
220: a_bool
221: OrderSetWrapper::FindUnmatched( int & i )
222: /***************************************/
223: // Search for an unmatched element at or around the current position.
224: // Return TRUE if one is found and set i to the position of the
225: // unmatched element, otherwise return FALSE.
226: {
227:    if( Fixed(__i) ) {
228:        // The current position is fixed. Do not look at neighboring
229:        // positions
230:        i = __i;
231:        return !Marked(i);
232:
233:    } else {
234:        // Search left for the first unmatched element
235:        for( i=__i; i >= 0 && Marked(i); --i ) { }
236:        // Search right
237:        if( i == -1 ) {
238:            for( i=__i+1; i<__os.Size( ) && Marked(i); ++i ) { }
239:            // Didn't find any unmatched elements
240:            if( i == __os.Size( ) ) {
241:                return FALSE;
242:            }
243:        }
244:        return TRUE;
245:    }
246: }
```

The below MatchExpr routine searches for an unmarked matching expression that is at or around the current position. If a match is found it returns TRUE and sets i equal to the position of the match:

```
248: a_bool
249: OrderSetWrapper::MatchExpr( p_expr e, int & i )
250: /***********************************************/
```

-continued

```
251: // Try to find an unmarked expression equal to 'e' that is at or
252: // around the current position. If it found, return TRUE and set 'i'
253: // equal to the position of the match. Otherwise, return FALSE.
254: {
255:    if( Fixed(__i) ) {
256:       // The current position is fixed. Return TRUE only if the
257:       // current expression is equal to 'e'
258:       i = __i;
259:       return e == Expr(i);
260:
261:    } else {
262:       // The current position is unfixed. Search for a matching
263:       // expression to the right
264:       for( i=__i+1; i<__os.Size( ) && !Fixed(i); ++i ) {
265:          if( !Marked(i) && Expr(i) == e ) {
266:             return TRUE;
267:          }
268:       }
269:       // Search left
270:       for( i=__i; i>=0 && !Fixed(i); --i ) {
271:          if( !Marked(i) && Expr(i) == e ) {
272:             return TRUE;
273:          }
274:       }
275:       return FALSE;
276:    }
277: }
```

The following matchUnfixedRegion method attempts to match elements in unfixed regions:

```
279: a_bool
280: OrderSet::matchUnfixedRegion(
281:    OrderSetWrapper &    o1,
282:    OrderSetWrapper &    o2,
283:    OrderSet*            result )
284: /*************************************/
285: // Both o1 and o2 are currently in unfixed regions. For the shorter
286: // unfixed region, match every element in the other unfixed region
287: {
288:    int count1 = o1.CountUnfixedElements( o2.Size( ) );
289:    int count2 = o2.CountUnfixedElements( o1.Size( ) );
290:
291:    // Match all elements of the smaller unfixed region
292:    if( count1 > count2 ) {
293:       return o2.MatchUnfixedRegion( count2, o1, result );
294:    } else {
295:       return o1.MatchUnfixedRegion( count1, o2, result );
296:    }
297: }
```

The CountUnfixedElements routine set forth below returns the number of unmarked, unfixed elements at or surrounding the current position:

```
300: int
301: OrderSetWrapper::CountUnfixedElements( const int r )
302: /*************************************/
303: // Return the number of unmarked, unfixed elements at or
304: // surrounding the current position and before r
305: {
306:    int count = 0;
307:    int j;
308:    // Count right
309:    for( j=__i; j<__os.Size( ) && j<r+__deleted && !Fixed(j); ++j ) {
310:       if( !Marked(j) ) {
311:          ++ count;
312:       }
313:    }
314:    // Count left
315:    for( j=__i-1; j>=0 && !Fixed(j); --j ) {
316:       if( !Marked(j) ) {
317:          ++ count;
318:       }
319:    }
320:    return count;
321: }
```

The following MatchUnfixedRegion method performs a first pass to match as many elements as possible, but allows elements to remain unmatched. It then performs a second pass to make sure any elements that remained unmatched in the first pass can be removed with a functional dependency.

```
323: a_bool
324: OrderSetWrapper::MatchUnfixedRegion(
325:    const int     count,
326:    OrderSetWrapper &     other,
327:    OrderSet *    result )
328: /*************************************/
329: {
330:    // Pass 1: match all the elements that we can, but allow elements
331:    // to remain unmatched without giving up
332:    int j;
333:    a_bool unmatched = FALSE;
334:    for( j=0; j<count; ++j ) {
335:       if( !OrderSet::setElement( *this, other, result ) ) {
336:          unmatched = TRUE;
337:          ++ __i;
338:       }
339:    }
340:
341:    // Pass 2: make sure any elements that remained unmatched in the
342:    // first pass can be removed with a functional dependency
343:    if( unmatched ) {
344:       for( j=__i-1; j>=0 && !Fixed(j); --j ) {
345:          if( !Marked(j) ) {
346:             if( FunctionallyDetermined( j ) ) {
347:                -- __i;
348:             } else {
349:                return FALSE;
350:             }
351:          }
352:       }
353:    }
354:    return TRUE;
355: }
```

The MatchTail routine illustrated below matches remaining elements after all elements of the order property that is being intersected with have been matched:

```
358: a_bool
359: OrderSetWrapper::MatchTail( OrderSet * result, PlanSegmentSet wildcard )
360: /*****************************************************/
361: // Match remaining elements after all elements of the other order
362: // property we are intersecting with have been matched
363: {
364:    int j;
365:    a_bool fix_first;
366:
367:    // An unfixed region that matches the wildcard should not be
368:    // considered part of any preceding unfixed region. Prevent this,
369:    // if necessary, by fixing the first element that matches the
370:    // wildcard.
371:    if( result->Size( ) > 0 && !result->ElementFixedPosition( result->Size( ) - 1 ) ) {
372:       fix_first = TRUE;
373:    } else {
374:       fix_first = FALSE;
```

```
375:    }
376:
377:    while( !Done( ) ) {
378:
379:        // Check if the current expression can match against the
380:        // wildcard of the other OrderSet, and if so, append the
381:        // expression to the result
382:        if( wildcard->Contains( Expr(j) ) ) {
383:            result->Append( Expr(j), Seq(j), Fixed(j) || fix_first );
384:            Mark( j );
385:            fix_first = FALSE;
386:
387:        // The expression did not match the wildcard, the intersection
388:        // is empty unless we can remove it using a functional
389:        // dependency
390:        } else if( !FunctionallyDetermined( j ) ) {
391:            return FALSE;
392:        }
393:    }
394:    return TRUE;
395: }
```

As shown in the above MatchTail method at lines 382-385, a check is made to determine if the current expression can match against the wildcard of the other OrderSet. If so, the expression is appended to the result. If the expression does not match the wildcard, the intersection is empty unless it can be removed using a functional dependency as illustrated at lines 390-392. The use of the above generalized order representation in query optimization will next be described.

Using Generalized Orders in Query Optimization

Figure 5:
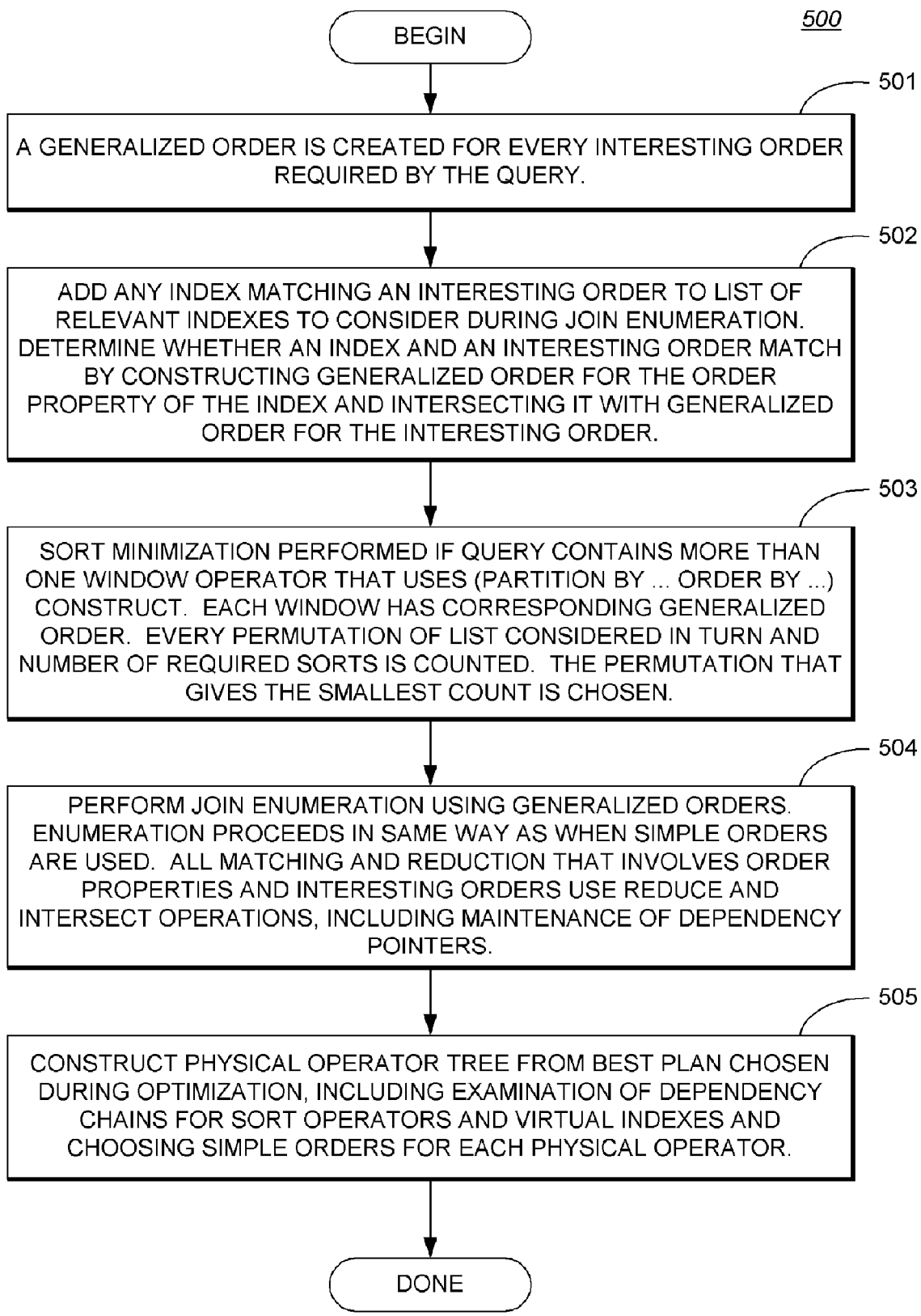
FIG. 5 comprises a flowchart illustrating the high-level method steps of the present invention for using generalized orders in query optimization.

FIG. 5 comprises a flowchart 500 illustrating the high-level method steps of the present invention for using generalized orders in query optimization. When a query is received by the query optimizer, the following describes the high-level operations which are performed for using generalized orders during query optimization. At step 501, a generalized order is created for every interesting order required by the query. More particularly, interesting orders are created for all of the following constructs:

1) ORDER BY x1 s1, x2 s2, . . . , xn sn, where each si is either "desc", "asc", or " " (which is interpreted as "asc"), gives the following generalized order:

(O, WILDCARD, DP)=([(x1,s1,true),(x2,s2,true), . . . ,(xn,sn,true)], all plan nodes, NULL)

2) GROUP BY x1, x2, . . . , xn, which gives this generalized order:

(O, WILDCARD, DP)=([(x1,ins,false),(x2,ins,false), . . . ,(xn,ins,false)], all plan nodes, NULL)

3) A set of equijoin conditions between two plan nodes t1 and t2:

t1.x1=t2.x1 and t1.x2=t2.x2 and . . . and t1.xn=t2.xn gives two generalized orders: ([(t1 x1,ins,true), (t1.x2,ins,true), . . . ,(t1.xn,ins,true)], all plan nodes, NULL)

([(t2.x1,ins,true),(t2.x2,ins,true), . . . ,(t2.xn,ins,true)], all plan nodes, NULL)

Note that the WILDCARD field for a join condition order property is changed during join enumeration to equal the set of plan nodes that appear below the order property in the plan.

4) PARTITION BY x1, x2, . . . , xn ORDER BY y1 s1, y2 s2, . . . , ym sm gives the following generalized orders:

([(x1,ins,false),(x2,ins,false), . . . ,(xn,ins,false), (y1, s1,true), (y2,s2,true), . . . , (ym,sm,true)], all plan nodes, NULL)

5) aggr(expr ORDER BY x1 s1, x2 s2, . . . , xn sn) where aggr is one of the special aggregate functions that allows an order clause to be treated the same as ORDER BY x1 s1, x2 s2, . . . , xn sn.

6) A virtual index on table T with columns x1 s1, x2 s2, . . . , xn sn gives the following generalized order:

(O, WILDCARD, DP)=([(x1,s1,false),(x2,s2,false), . . . ,(xn,sn,false)], {T}, NULL)

The next step of pre-optimization that uses generalized orders is the selection of relevant indexes to consider during join enumeration. At step 502, any index that matches an interesting order is added to the list of relevant indexes to be considered during the join enumeration process. Whether an index and an interesting order match is determined by constructing the generalized order corresponding to the order property of an index and intersecting it with the generalized order for the interesting order. An index on the columns (x1 s1, x2 s2, . . . , xn sn) gives the following generalized order:

([(x1,s1,true),(x2,s2,true), . . . ,(xn,sn,true)], { }, NULL)

At step 503, a sort minimization is performed if a query contains more than one window operator that uses the (PARTITION BY . . . ORDER BY . . . ) construct. Each window has a corresponding generalized order. Suppose the list of generalized orders is g1,g2, . . . ,gn. Every permutation of this list is considered in turn, the number of required sorts is counted, and the permutation that gives the smallest count (minimum number of sorts) is chosen. The sort minimization method is as follows:

```
1: let BEST_COUNT = infinity
2: let BEST_PERMUTATION = ( )
3: for every permutation P=(p1,p2,...,pn) of (g1,g2,...,gn)
4:     let COUNT = 1
5:     let S=p1
6:     for i from 2 to n
7:         let S = S intersect pi
8:         if S is empty
9:             let COUNT=COUNT+1
10:            let S = pi
11:    endfor
12:    if COUNT < BEST_COUNT then
13:        let BEST_COUNT = COUNT
14:        let BEST_PERMUTATION=P
15:    endif
16: endfor
```

Note that this is an exhaustive search with worst-case exponential time. Therefore, the system stops considering new permutations in cases where the process is taking too long. The logic used to stop considering new permutations is not included in the pseudocode above.

The next phase of optimization that involves generalized orders is join enumeration which is performed at step 504. This enumeration proceeds in the same way as when simple orders are used. All matching and reduction involving order properties and interesting orders uses the above-described reduce and intersect operations for generalized orders. This includes maintenance of the dependency pointers as previously detailed.

The final step that involves generalized orders is the construction of a physical operator tree from the best plan chosen during optimization at step 505. This involves examination of the dependency chains for sort operators and virtual indexes as previously described and choosing simple orders for each physical operator.

Example of Use of Generalized Orders in Optimizing a Query

The methodology of the present invention may be illustrating by an example. Consider, for instance, a case involving the following example query:

```
1: select sum(e1) over (partition by T.x1),

2: sum(e2) over (partition by R.x1 order by T.x2
   DESC),

3: sum(e3) over (partition by T.x1, T.x3)

4: from T join R on T.x1=R.x1

5: group by T.x1, R.x2, T.x3

6: order by T.x1 ASC
```

When the above query is received by the database system, a generalized order is created for every interesting order, including interesting orders for the window functions (g1, g2, g3), the equality conditions (g4, g5), the group by clause (g6), and the order by clause (g7) as shown below. This process corresponds to step 501 of FIG. 5.

The generalized orders created to represent the interesting orders of the window functions are:

```
g1=([(T.x1, ins, false)], {T,R}, NULL)

g2=([(R.x1, ins, false),(T.x2, desc, true)], {T,R},
    NULL)

g3=([(T.x1, ins, false),(T.x3, ins, false)], {T,R},
    NULL)
```

The generalized orders created to represent the interesting orders of the equality conditions are:

```
g4=([(T.x1, ins, false)], {T,R}, NULL)

g5=([(R.x1, ins, false)], {T,R}, NULL)
```

The generalized order created to represent the interesting order of the group by clause is:

```
g6=([(T.x1, ins, false), (R.x2, ins, false), (T.x3, ins,
    false)], {T,R}, NULL)
```

The generalized order created to represent the interesting order of the order by clause is:

```
g7=([(T.x1, asc, true)], {T,R}, NULL)
```

The next step of query optimization (pre-optimization) that uses generalized orders is the selection of relevant indexes to consider during join enumeration as depicted in step 502 at FIG. 5. Any index that matches an interesting order is added to the list of relevant indexes to be considered during the join enumeration process. For purposes of this discussion, also assume that only one index "tidx" exists for the table T on the columns <T.x1 asc, T.x2 desc>. Whether this index matches an interesting order is determined by constructing the generalized order corresponding to the order property of an index and then intersecting it with the generalized order for the interesting order. Accordingly, a generalized order g8 is created corresponding to the order property of the index "tidx" as follows:

```
g8=([(T.x1, asc, true), (T.x2, desc, true)], { },
    NULL)
```

The interesting orders g1 to g7 are then tested against the order property g8. In this case, non-empty matches are found for the interesting orders g1, g2, g4, and g7. Hence, the index "tidx" is considered a relevant index for this query and it will be considered during the join enumeration process.

The next step of optimization involving generalized orders is to apply the above-described sort minimization to the generalized orders created for the window operators, namely g1, g2, and g3 in this example. This process corresponds to step 503 illustrated at FIG. 5. The sort minimization routine finds the permutation (g2,g1,g3) that needs only two sort operations on:

```
g9=([(T.x1, ins, true), (T.x2, desc, true)], {T,R},
    NULL) and g10=([(T.x1, ins, false), (T.x3, ins, false)], {T,R},
     NULL).
```

Also shown below are some of the intersections computed during this sort minimization with the set of functional dependencies FD={T.x1—>R.x1, R.x1—>T.x1}:

```
g1 intersect g2=([(T.x1, ins, true),(T.x2, desc, true)],
    {T,R}, NULL)

g1 intersect g3=([(T.x1, ins, false),(T.x3, ins, true)],
    {T,R}, NULL)

g2 intersect g3=([ ], { }, NULL)

g1 intersect g2 intersect g3=([ ], { }, NULL)
```

Figure 6A:
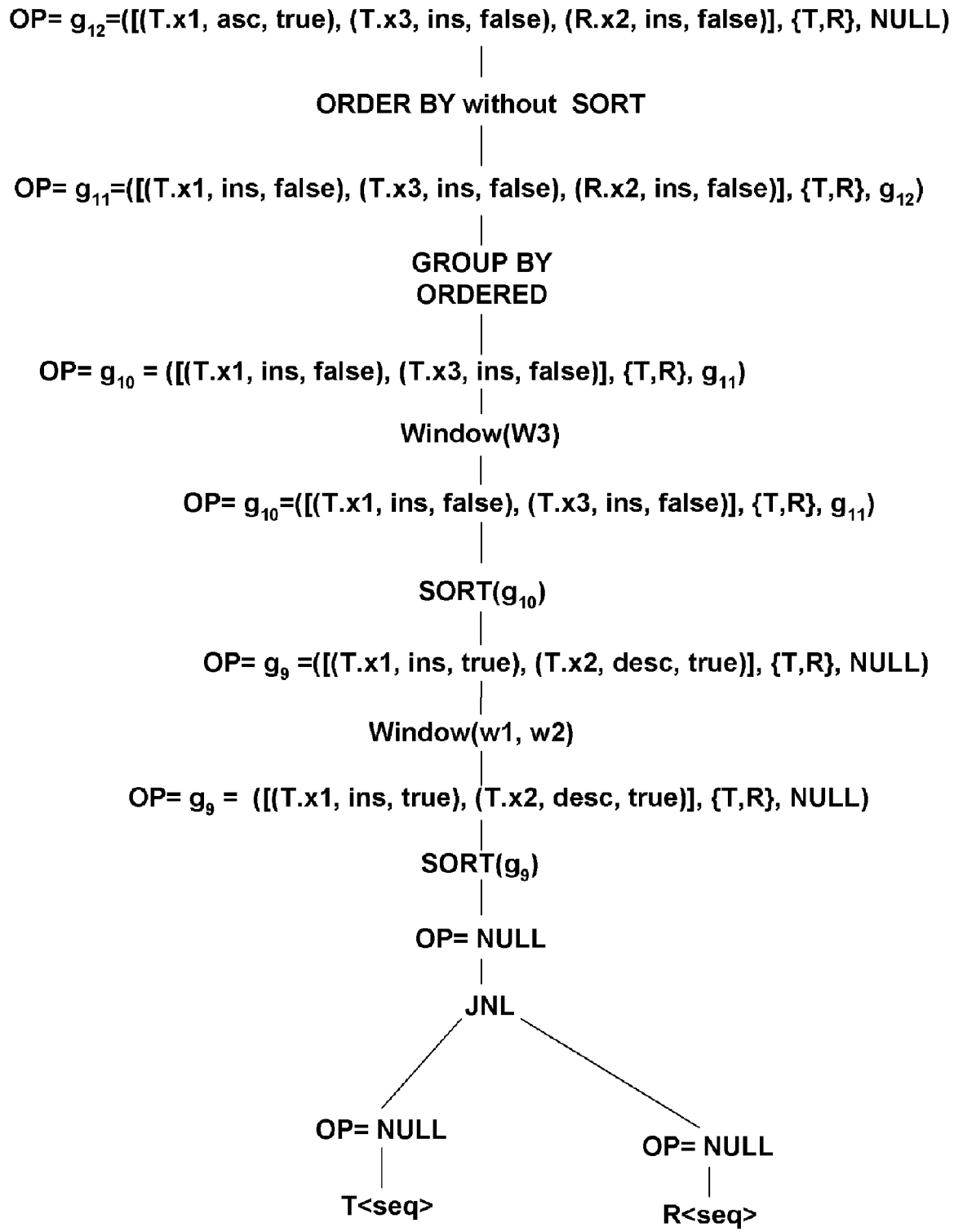
FIGS. 6A-B are diagrams illustrating two different access plans that may be enumerated by the join enumeration algorithm used in the currently preferred embodiment of the present invention.
Figure 6B:
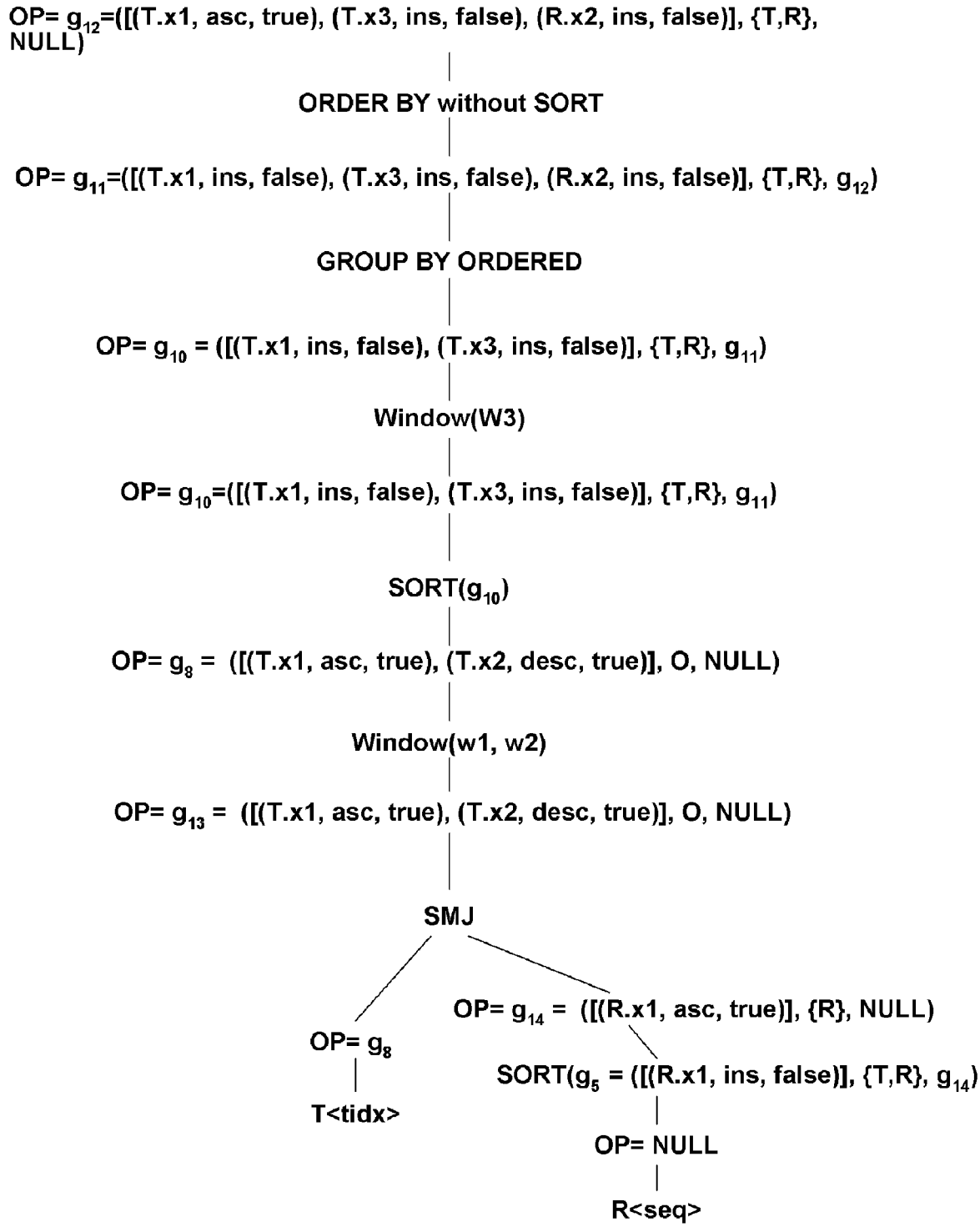

After the above steps, the join enumeration is performed as provided at step 504 at FIG. 5. During join enumeration, the matching of interesting orders is done with the order properties for each plan node being enumerated. FIGS. 6A-B are diagrams illustrating two different access plans enumerated by the join enumeration algorithm used in the currently preferred embodiment of the present invention. In these access plans, the order properties are shown computed after each operator, denoted by "OP" in the figures. In FIG. 6A, an access plan is shown that joins the tables T and R using a Join Nested Loops (NL) operator, and then applies the window operators for the Windows w1="sum(e1) over (partition by (T.x1))", w2="sum(e2) over (partition by (R.x1 order by T.x2 DESC)))" and w3="sum(e3) over (partition by (T.x1, T.x3))". Up to this point, only two sorts are introduced in the access plan at FIG. 6A, and the order properties are computed given these two sorts. The access plan shown at FIG. 6A is completed with the GROUP BY operator and ORDER BY operator. To satisfy the interesting order g6 corresponding to the GROUP BY clause, an intersection is performed with g10 to give a new order property g11. As discussed above, the order property g10 now has its dependency link set to g11. Next, the ORDER BY operator is placed in the access plan at FIG. 6A which triggers the intersection of the order property g11 with the interesting order g7. The result is a new order property g12 and the dependency pointer of g11 is updated (set) to point to g12.

FIG. 6B, is a diagram illustrating another access plan considered during join enumeration. As shown, the access plan at FIG. 6B contains a Sort Merge Join (SMJ) operator which joins T and R. The interesting order g4 is satisfied by the order property obtained from the complete index scan of T using the index "tidx". However, the interesting order g5 cannot be satisfied unless a SORT operator is introduced on top of the sequential scan of the table R. After the SMJ operator, g8 matches the window operator's interesting order, hence no SORT is needed this time before the operator "Window(w1, w2)". After the "Window(w1, w2)" operator is placed in the access plan at FIG. 6B, the suffix of the plan is similar to the one constructed for the access plan depicted at FIG. 6A. After alternative access plans are enumerated, a best plan is selected by the optimizer based on costs of the alternative plans. Assume that the access plan shown at FIG. 6B is chosen as the best plan. In this event, the SORT operators should choose simple orders that satisfy the generalized orders used in the access plan shown at FIG. 6B.

Figure 7:
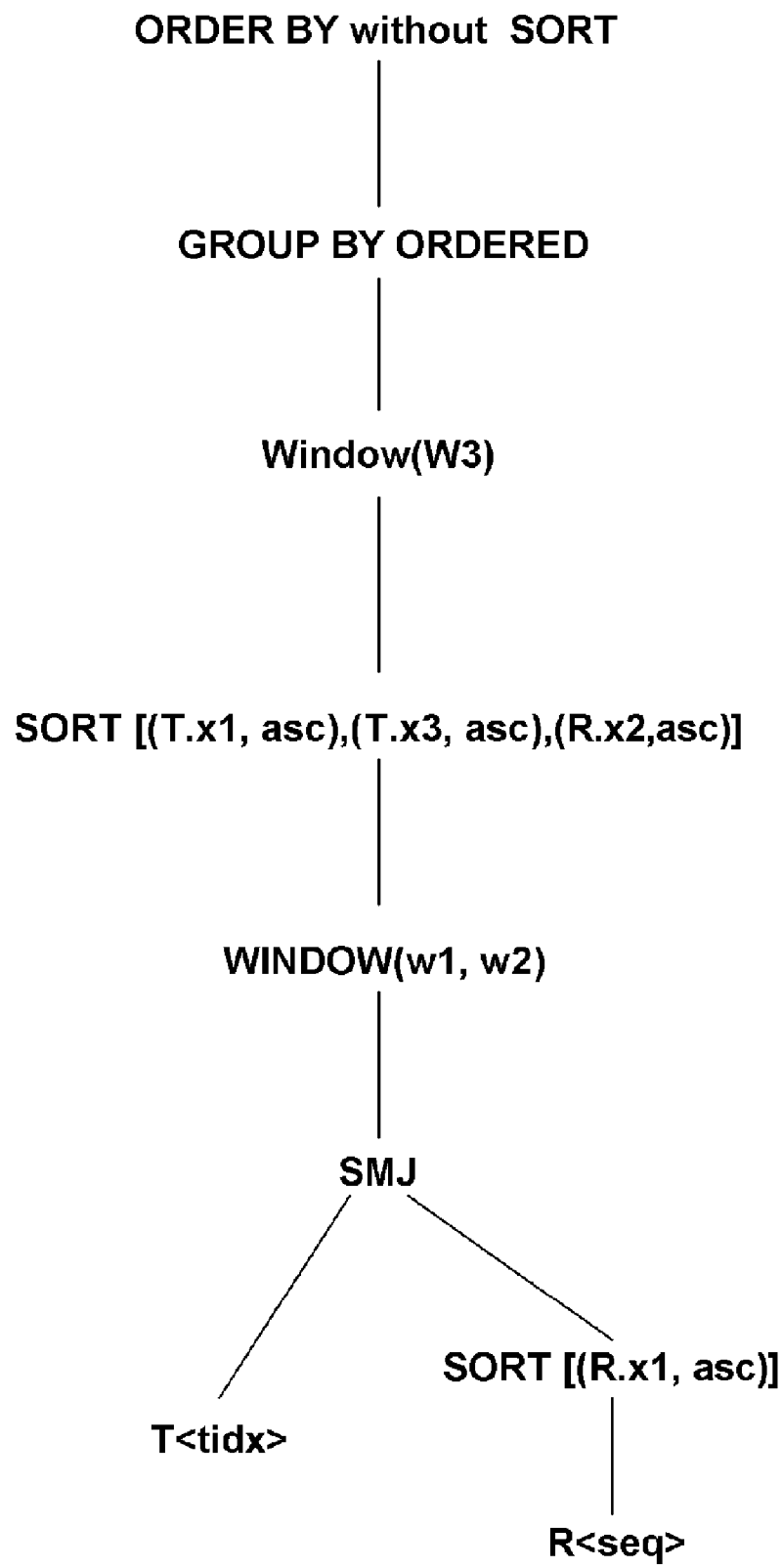
FIG. 7 is a diagram illustrating the process of choosing simple orders that satisfy the generalized orders used in an example access plan.

FIG. 7 is a diagram illustrating the process of choosing simple orders that satisfy the generalized orders used in the example access plan of FIG. 6B. This corresponds to step 505 as depicted at FIG. 5. The process of choosing simple orders starts bottom up: first for the operator SORT(g5), the simple order (R.x1, asc) is chosen following the dependency link to g14 as shown in FIG. 7. Next, for the operator SORT (g10), the chain of dependency links from g10 to g11 to g12 is followed and a simple order that satisfies g12 is chosen. The simple order is [(T.x1, asc), T.x3.asc), (R.x2,asc)] as shown in FIG. 7. Note that the simple order that is selected satisfies all the interesting orders of the operators "Window (w3)", "GROUPBY order", and "ORDER BY", as decided in the access plan depicted in FIG. 6B. Therefore, no additional SORT is required.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for optimizing a query requesting data from a database in an ordered form, the method comprising:
    generating a plurality of partial access plans for obtaining data requested by the query;
    constructing generalized orders representing requirements of the query for ordering of data, each generalized order including an array having a plurality of entries, wherein each of said plurality of entries includes an expression, a sequence type, and a fixed attribute;
    creating generalized orders representing order properties of said partial access plans;
    intersecting the generalized orders representing requirements of the query for ordering of data with the generalized orders representing order properties of said partial access plans to determine partial access plans having matching orderings, wherein said intersecting step includes constructing a new generalized order representing results of intersecting a generalized order representing requirements of the query for ordering of data with a generalized orders representing order properties of a partial access plan; and
    building a query execution plan for obtaining and ordering the data requested by the query based, at least in part, on selecting partial access plans having matching orderings.

2. The method of claim 1, wherein said constructing step includes constructing a generalized order representing to interesting orders of the query; wherein said interesting orders comprise requirements of the query for ordering of data that are useful for choosing operators for executing the query.

3. The method of claim 1, wherein said generalized order represents a set of simple orders in a single data structure.

4. The method of claim 1, wherein the fixed attribute is a Boolean value.

5. The method of claim 1, wherein said sequence type includes ascending, descending, and insensitive.

6. The method of claim 1, wherein said generalized order further comprises a wildcard entry for representing additional orderings not included in the array.

7. The method of claim 6, wherein said wildcard entry represents orderings that are constructed by appending zero or more expressions to those included in the array.

8. The method of claim 1, wherein said intersecting step includes calculating and storing a result of every non-empty intersection.

9. The method of claim 1, wherein the generalized order further comprises a dependency pointer for pointing to another generalized order.

10. The method of claim 9, wherein said intersecting step includes setting the dependency pointer to point to the new generalized order representing the results.

11. The method of claim 10, wherein said building step includes traversing a chain of dependency pointers to select a partial access plan having orderings matching requirements of the query for ordering of data.

12. The method of claim 1, wherein said building step includes selecting a partial access plan having an ordering included within the new generalized order.

13. The method of claim 1, wherein said creating step includes creating a generalized order representing order properties of an available index.

14. The method of claim 13, wherein said intersecting step includes intersecting the generalized order representing order properties of an available index with a generalized order representing requirements of the query for ordering of data.

15. The method of claim 1, further comprising: performing a sort minimization if a query contains more than one window operator using a PARTITION BY, ORDER BY construct.

16. A computer-readable medium having processor-executable instructions for performing the method of claim 1.

17. A system for optimizing a query requesting data from a database in an ordered form, the system comprising:
    a module for generating a plurality of partial plans for obtaining data requested by the query;
    a generalized order comprising a data structure including an array having a plurality of entries; wherein each of said plurality of entries includes an expression, a sequence type, and a fixed attribute;
    a module for constructing generalized orders representing interesting orders of the query and generalized orders representing order properties of each of said plurality of partial plans; wherein said interesting orders comprise requirements of the query for ordering of data that may be useful for choosing operators for executing the query;
    a matching module for determining if a partial plan has order properties matching the interesting orders based on comparing a generalized order representing order properties of the partial plan with generalized orders representing interesting orders, wherein said intersecting step includes constructing a new generalized order representing results of intersecting a generalized order representing requirements of the query for ordering of data with a generalized orders representing order properties of a partial access plan; and a module for building a query execution plan for obtaining and ordering the data requested by the query based, at least in part, on selecting partial plans having order properties matching the interesting orders.

18. The system of claim 17, wherein a generalized order representing an interesting order comprises a set of simple orders representing requirements of the query for ordering of data.

19. The system of claim 17, wherein said generalized order represents a set of simple orders in a single data structure.

20. The system of claim 17, wherein the fixed attribute is a Boolean value.

21. The system of claim 17, wherein said sequence type includes ascending, descending, and insensitive.

22. The system of claim 17, wherein said generalized order data structure further comprises a wildcard entry for representing additional orderings not included in the array.

23. The system of claim 22, wherein said wildcard entry represents orderings that are constructed by appending zero or more expressions to those included in the array.

24. The system of claim 17, wherein the matching module intersects the generalized order representing order properties of a partial plan with a generalized order representing an interesting order.

25. The system of claim 17, wherein the generalized order data structure further comprises a dependency pointer for pointing to another generalized order.

26. The system of claim 25, wherein the matching module sets a dependency pointer to point to the new generalized order.

27. The system of claim 26, wherein the module for building traverses a chain of dependency pointers to select a partial plan having matching orderings.

28. The system of claim 17, wherein the module for building selects a partial plan having an ordering included within the new generalized order.

29. The system of claim 17, wherein the module for constructing creates a generalized order representing order properties of an available index.

30. The system of claim 29, wherein the matching module intersects the generalized order representing order properties of an available index with a generalized order representing an interesting order.

31. The system of claim 17, further comprising: a sort minimization
module which performs a sort minimization if a query contains more than one window operator using a PARTITION BY, ORDER BY construct.

32. The system of claim 31, wherein said sort minimization module selects a partial plan having a minimum number of sort operators.

* * * * *